2,307,022

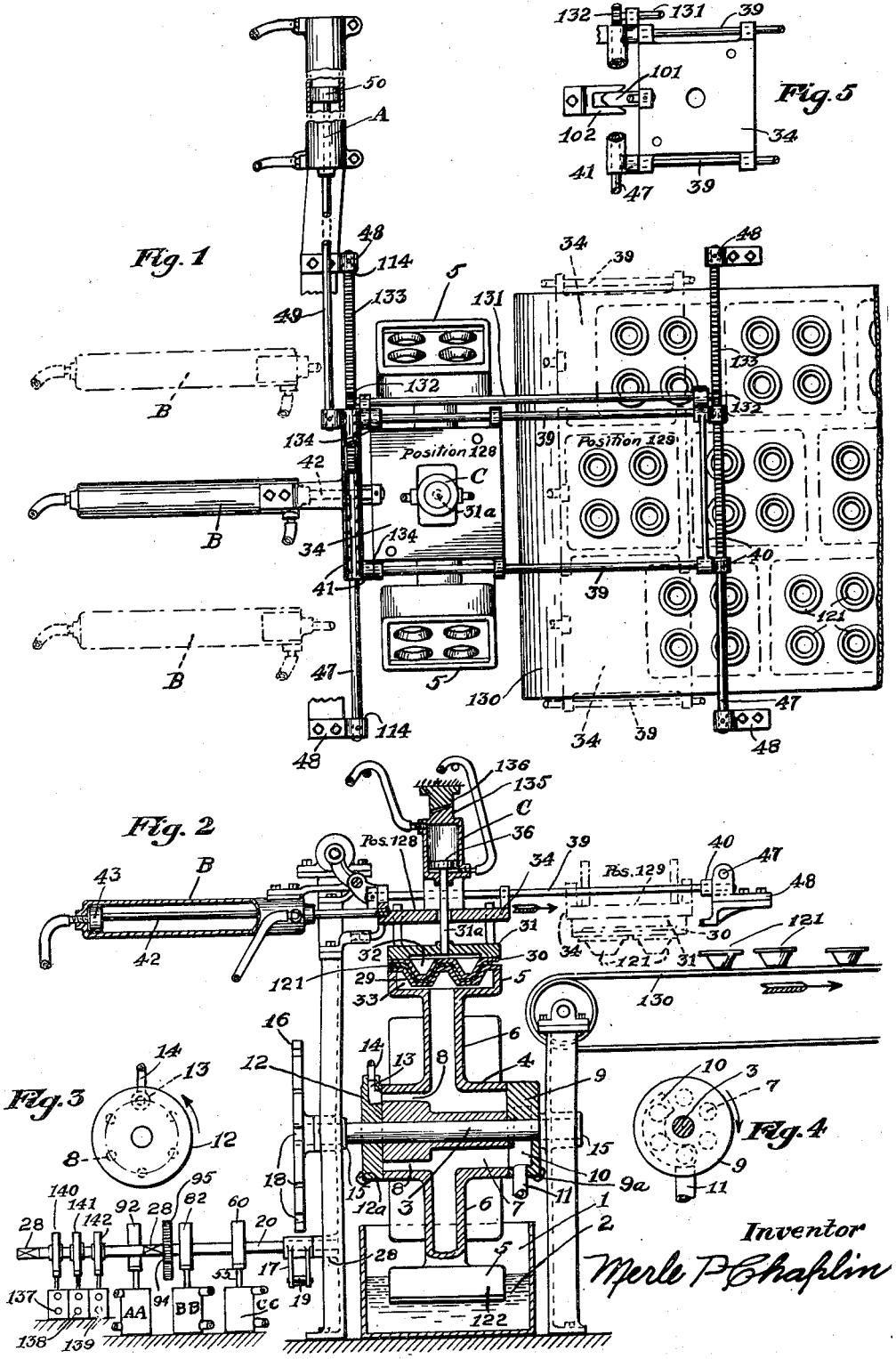
Jan. 5, 1943.   M. P. CHAPLIN   2,307,022
PULP MOLDING MACHINE AND DISTRIBUTING DEVICE
Filed May 6, 1937   3 Sheets-Sheet 1
Inventor
Merle P. Chaplin Jan. 5, 1943.　　M. P. CHAPLIN　　2,307,022
PULP MOLDING MACHINE AND DISTRIBUTING DEVICE
Filed May 6, 1937　　3 Sheets-Sheet 2
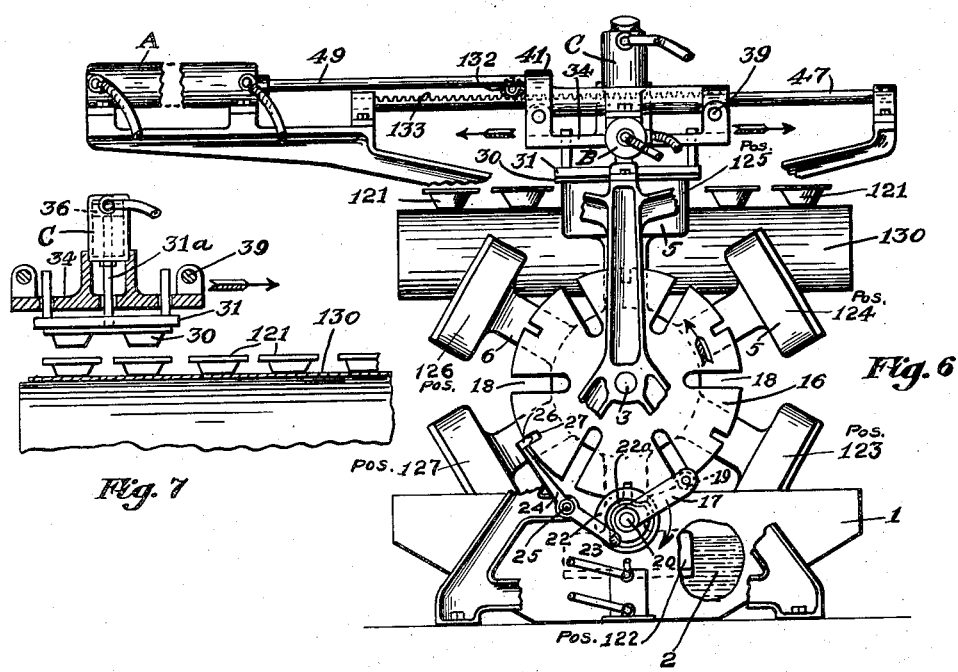
Inventor,
Merle P. Chaplin Jan. 5, 1943. M. P. CHAPLIN 2,307,022
PULP MOLDING MACHINE AND DISTRIBUTING DEVICE
Filed May 6, 1937 3 Sheets-Sheet 3
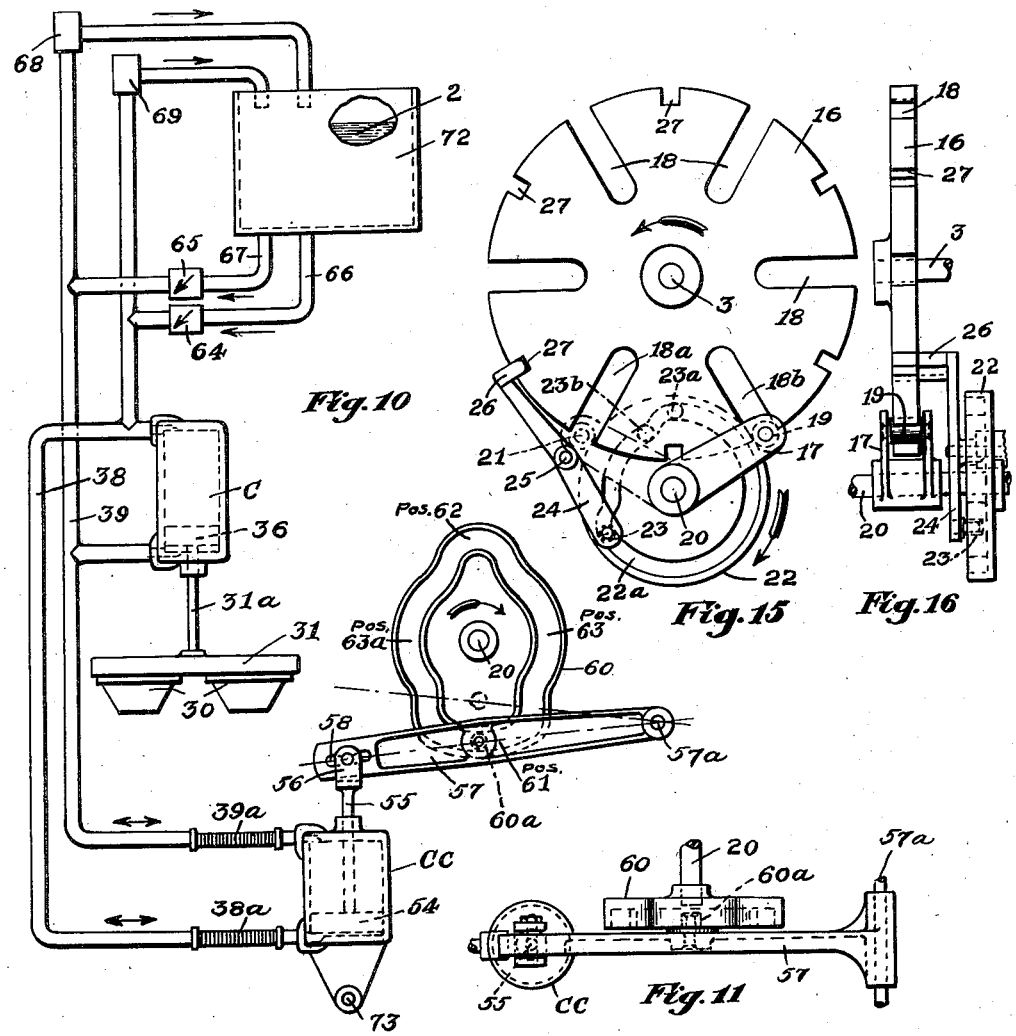
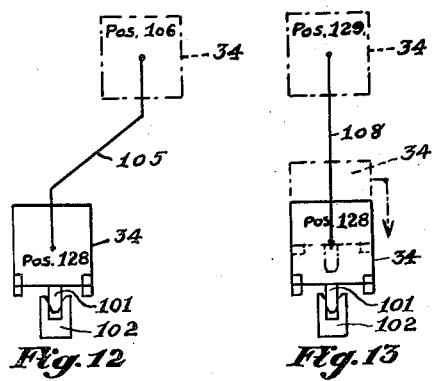
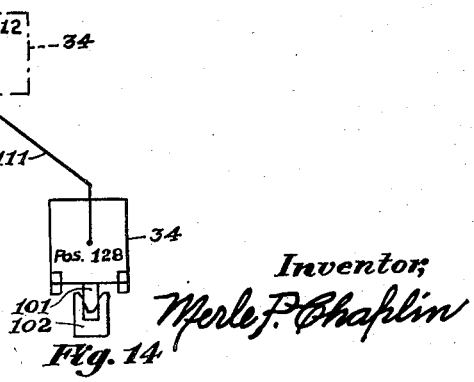
Inventor;
Merle P. Chaplin Patented Jan. 5, 1943

UNITED STATES PATENT OFFICE 2,307,022

PULP MOLDING MACHINE AND DISTRIBUTING DEVICE

Merle P. Chaplin, South Portland, Maine, assignor to Chaplin Corporation, South Portland, Maine, a corporation of Maine Application May 6, 1937, Serial No. 141,058

17 Claims. (Cl. 92—56)

In the production of certain kinds and sizes of molded fibrous pulp articles it is necessary to transfer them from the molding and forming dies to some other device or mechanism for drying, finishing or other treatment. A freshly molded pulp article is relatively weak and easily distorted and damaged. Any distortion or rupture of the molded article, between the time that it is molded and the time which it is dried and finished, greatly injures the quality of the finished product.

Certain articles, having considerable depth, are particularly difficult to handle. Articles having a large surface area, without sufficient longitudinal stiffness to enable them to hold their shape, must not be distorted or bent while soft and wet, as such treatment will frequently result in the finished product being warped and distorted.

It is the purpose of this invention to provide a machine and mechanism for molding articles from liquid pulp mixtures and delivering said articles to such other devices or mechanisms as may be necessary for further treatment. It is particularly adapted for molding large articles as well as articles having considerable depth. It provides means for transferring these articles without injury or distortion, delivering them gently and without shock, to a conveyer or other device.

Reference is made to the following figures:

Fig. 1 is a plan view of the machine including the transfer device and a portion of the dryer conveyer belt.

Fig. 2 is an elevation, partly in section, of the machine shown in Fig. 1.

Fig. 3 is an end view of the port-box on one end of the molding unit.

Fig. 4 is an elevation of the port-box on the opposite end of the molding unit.

Fig. 5 is a plan view of the traveler showing the centering device.

Fig. 6 is an end view of the machine showing the stepping mechanism, molding unit and transfer device.

Fig. 7 is an end view, partly in section of the transfer mechanism.

Fig. 8 is a view of the operating mechanism controlling the transverse movements of the transfer mechanism.

Fig. 9 is a view of the operating mechanism controlling the longitudinal movements of the transfer device.

Fig. 8—a is a detail view of the adjusting mechanism used on the operating cylinders.

Fig. 9—a is a detail of the cam-roll used in conjunction with a cam-track for operating the pistons in operating cylinders.

Fig. 10 is a diagrammatic view illustrating the operating mechanism for controlling the up and down movement of the transfer dies.

Fig. 11 is a plan view of the cam, cam-lever, and operating cylinder of Fig. 10.

Figs. 12, 13 and 14 are diagrammatic views illustrating the longitudinal and transverse movements of the transfer die.

Fig. 15 is an end view of the mechanism for stepping, and locking in position, the molding dies.

Fig. 16 is a side view of the stepping and locking mechanism of Fig. 15.

The articles to be molded are formed from a mixture of fibres and liquid 2 contained in tank 1. This liquid mixture is supplied to tank 1, by means not shown, and maintained at a substantially uniform level or depth.

Mounted above this tank is a shaft 3 journaled in suitable bearings at 15. Mounted on this shaft, and rotating with it is a hub member 4, having a plurality of hollow spoke sections 6 terminating at their outer ends in outwardly facing die-mounting members 5.

Mounted adjacent to each end of the hub 4 are port-boxes 9 and 12. These are mounted loosely on shaft 3, and are held against rotation with said shaft or with hub 4, by lugs 9—a and 12—a.

Port-box 9 contains a chamber 10, having an opening adjacent to, and abutting hub 4. This chamber 10 is arranged to provide vacuum connections to the passages 7, which in turn, communicate with the hollow arms 6. These passages 7 during a certain period of rotation of the hub 4 are in communication with chamber 10 for purposes hereinafter explained. Connecting to chamber 10 is a pipe 11.

The port-box 12, mounted adjacent to and abutting the adjacent end of hub 4 opposite from port-box 9, is provided with a chamber 13 which at certain times in the rotation of hub 4 communicates with passages 8, in said hub. A pipe 14, connects to chamber 13.

The hub 4, together with hollow-arms 6, and die-mounting members 5, is rotated together with shaft 3 by means of a stepping wheel 16. This stepping wheel 16 is periodically rotated or stepped one die position, by means of stepping arm 17 and roller 19 cooperating with slots 18, in the stepping wheel (Fig. 15). This arm 17, is mounted on a shaft 20, journaled in bearings 28, and shaft 20, is continuously rotated in the direction of the arrow.

In the position shown in Fig. 15, the roll 19, is shown just as it is leaving one of the slots 18, and after having rotated or stepped the wheel 16 in the direction of the arrow one slot space or one die position. Continued rotation of shaft 20 in the direction of the arrow, brings the arm 17, and the roll 19, into the dotted line position 21. In this position the roll 19, is about to enter one of the slots 18, designated at 18—a and continued rotation of the shaft 20 and the arm 17 moves slot 18, and the stepping wheel 16, from the position indicated at 18—a, to the position indicated at 18—b.

During the time that the arm 17, with the roll 19, is moving from the full line position, in which it is shown in Fig. 15, to the dotted line position therein indicated at 21, the stepping wheel 16, is held against movement or rotation by means of lock-bar 26, engaging notches 27, in the stepping wheel 16. This lock-bar 26 is moved into, and out of engagement with notches 27, by means of cam 22, located and rotating with shaft 20. This lock-bar 26, is mounted on one end of a lever 24, which lever is pivoted in mid-central position at 25. The opposite end of lever 24, from lock-bar 26, carries a roll 23, which cooperates with the cam-track 22—a in cam 22, to move the lever about its pivot 25.

In the position shown in Fig. 15, the lever 24 has just been moved by cam 22, to bring the lock-bar 26 into engagement with one of the notches 27. This lock-bar 26 will be held engaged in the notch 27, during the rotation of the shaft 20 and cam 22, until the position 23—a on the cam track 22—a has reached the cam-roll 23. At this time the stepping-arm 17, with its roll 19 has reached the dotted line position indicated at 21, and is about to enter slot 18—a. While the roll is entering the slot 18—a, preparatory to stepping the wheel 16 one die position, cam 22 moves from position 23—a to 23—b, withdrawing lock-bar 26 from the locking slot 27, and permitting stepping wheel 16 to be rotated.

It will thus be seen that the mechanism illustrated in Fig. 15, provides means for intermittently rotating the shaft 3 with the hub 4, die mounting members and other parts, leaving them periodically at rest or in a stationary position for stated or fixed periods, the object of which will be hereinafter explained.

It has already been mentioned that the rotating hub 4 has a plurality of hollow arms or spokes 6, on the outer ends of which are die mounting members 5. On members 5, may be mounted molding or forming dies of various sizes and shapes. For purposes of illustration there is shown mounted on member 5, a molding die 29, suitable for making four relatively deep molded pulp articles 121. This die 29, is of the foraminous type shaped to confor mto the desired molded article, and when mounted on member 5, forms a chamber 33 communicating with the interior of hollow-arm 6, and the ports 7 and 8, in hub 4.

During a certain part of the rotation of hub 4 one of these molding dies 29, on member 5, is immersed in the pulp mixture 2 of tank 1 as shown in Fig. 2. In this position, one of the ports 7 communicating with the chamber 33, behind this particular die, is also in communication with chamber 10 of the stationary port-box 9. Pipe 11, is connected to a vacuum pump or other means not shown, which removes any air or liquid contained in chamber 10, and establishes a vacuum in this chamber and in any ports or passages which may be connected therewith. It will thus be seen that the die 29, which has been immersed in pulp mixture 2, in the position indicated at 122, will have suction or vacuum applied to the chamber 33, behind this die urging the liquid in the pulp mixture 2, to pass through the foraminous die 29, through the hollow-arm 6, port 7 to the chamber 10, from which it will be drawn off through pipe 11.

The foraminous surface of die 29, retains the fibrous materials contained in the mixture 2, resulting in a deposit of these fibres, in a sheet or layer, over the outer surface of this die, thereby, molding the article 121. When a sufficiently thick deposit of fibres has been drawn by vacuum on the surface of die 29, the hub 4 with the dies mounted thereon, is moved one die position or step, and the particular die on which the article or articles have been formed, is moved from position 122 to position 123 (see Fig. 6). This brings another die from position 127 into position 122 for the formation of a second article or group of articles. The shaft 3 is again rotated or stepped, bringing the die on which the articles were formed, into position 124. During the time that the dies are in positions 123 and 124, the water or other liquid which has been drawn through the die is given time to drain away through the hollow-arm 6, passage 7, and the chamber 10, which is still in communication with the passage 7 and the die-chamber 33. A subsequent step or rotation of the shaft 3 brings the die or dies from position 124 to position 125 or diametrically opposite to the position 122, where the articles were formed from the pulp mixture 2. During this travel of the dies containing the article from position 123 to position 125, the molded or formed sheet or layer of fibres has become hardened and the most of the water or liquid of formation has been extracted therefrom.

Mounted directly above the forming die 29 when it is at position 125, Fig. 6, is a cooperating or complementary die 30, mounted on a die carrier or die mounting member 31. This member 31, is held by a piston rod 31—a, and is moved upwardly and downwardly by means of a piston 36, operating in cylinder C. This cylinder C is mounted on a traveling member 34, which member is capable of being moved in a horizontal direction traveling on guides 39.

The piston 36 operating in cylinder C is shown at its lower-most position in Figs. 2 and 10, with the die 30, cooperating with the die 29 on which the article was molded and compressing the article between these two dies. As soon as the article has been properly compressed, compressed-air is applied thru pipe 14, chamber 13, passage 8, and hollow-arm 6 to the chamber 33 behind the die 29. At the same time vacuum is applied to a chamber 32, formed behind the die 30, and between it and member 31, and the piston 36 is moved upwardly, by means more completely described hereinafter, separating the die 30, from the die 29, and taking the article 121 from the die 29, it then being retained on the die 30, by the suction applied to the chamber 32. Piston 36 draws the member 31 and the die 30, free and clear of the die 29, enabling the die 29 to be rotated about the shaft 3, from the position 125, to position 126, bringing a new die with articles thereon, into position 125.

In order that adequate pressure may be placed on the molded articles by the dies 30 and 29, and to avoid making the guides and travelers unnecessarily heavy, a fixed abutment 136 is provided above cylinder C, when it is over the molding dies, this abutment being strongly secured to the machine frame. The lower surface of this abutment 136 is slightly tapered, as shown in Fig. 2, and on the top of the cylinder C, is a complementary tapered part 135, which comes into close relation with abutment 136, when the traveler 34 is against its stops 134.

This provision permits the guides 39 and 47, together with the travelers 34, and also 40 and 41 to be made light in weight, as all they are required to do is to convey the molded articles from the molding dies to the discharge position over the conveyer. Making the travelers and associated parts light in weight enables them to be quickly and easily moved by means of the cylinders B and A.

For controlling the compressed-air supplied thru pipe 14, to chamber 33, there is provided an air-valve 139, operated by cam 142, on shaft 20. Compressed air is supplied to the air valve 139, which valve is opened at the proper time by cam 142, supplying air under pressure to pipe 14, in port-box 12.

For supplying both air and vacuum to the chamber 32, behind the die 30, a vacuum valve 137, operated by cam 140 and a compressed air valve 138, operated by a cam 141, are provided. Both of the above cams are fixed and rotate with shaft 20. Connection is made from valve 137, to a vacuum source not shown, and also a connection is made from valve 137, to the chamber 32, behind die 30. Similarly, compressed-air is supplied to valve 138, and a pipe connection is made from this valve to chamber 32.

The valve 137 is operated by cam 140, at the proper time, whereupon the valve places vacuum or suction on the chamber 32 for removing the article from die 29 as has already been described The valve 138, is operated by cam 141, to supply compressed-air to chamber 32, for discharging the article from the die 30, to the conveyer belt 130.

Pipe connections from the valves 137, 138 and 139, to the respective devices which these valves control, are omitted for purposes of clarity of the rest of the mechanism.

While the forming dies are moving to new positions, the traveler 34, is moved from position 128 to position 129 (Fig. 1), by means of piston-rod 42, and piston 43, operating in cylinder B. When the traveler 34, has moved to position 129 carrying with it member 31, die 30, with the molded articles 121, thereon, it is over a traveling conveyer 130, which may be a belt operating in connection with a dryer or other means for removing the water or other liquid remaining in the articles. When the traveler reaches position 129, the die 30, is moved downwardly by means of piston 36, until the articles are just above the belt 130. At this instant the vacuum is cut off from the chamber 32, behind the die 30 and a short blast of compressed-air is introduced into this chamber insuring that the articles be dislodged from the die and deposited on the belt 130. At this point in the cycle, the piston 36 draws the die 30 rapidly upward to clear the article which is then carried by the constantly moving belt 130, a sufficient distance to enable a second article or group of articles to be deposited thereon.

It will be noted in Fig. 1, that the articles are deposited in three rows over the conveyer belt 130. The object of this is to reduce travel speed of the belt 130 as much as possible, and to limit the length or size of the dryer necessary to evaporate the water contained in the molded articles.

It has already been mentioned that the traveler 34, is mounted on guides 39, to enable it to be moved longitudinally from position 128 to position 129. These guides 39 are in turn mounted on travelers 40 and 41, one end of each of the two guides 39, being mounted in one of these travelers 40, and the other end in traveler 41, which travelers in turn move transversely of the belt on guides 47. These guides 47 are held at their ends by brackets 48 fixed to the frame or some other stationary part of the machine.

Travelers 40 and 41 are moved on guides 47, by means of a piston-rod 49, and a piston 50 operating in cylinder A.

In order to insure that both of the travelers 40 and 41 move equally under the urge of piston-rod 49, and piston 50, a shaft 131 is mounted in the travelers 40 and 41, and on each end of this shaft are pinions 132. These pinions engage racks 133, mounted on guide-rods 47 or engage teeth cut directly in one side of these guides. It will thus be seen that the two pinions 132, engaging the racks 133, insure that the transverse movement of the travelers 40 and 41 will be the same. The cylinder B, thru its operating parts moves the die 30, from a position to engage the die 29, to a position over the conveyer belt 130. The die 30 is also moved transversely of the belt 130, by means of cylinder A, and its cooperating parts.

The means by which these cylinders A, B and C and the pistons, therein, are operated will now be described; first with reference to cylinder C, the operating mechanism for which is illustrated more in detail in Fig. 10.

In this figure there is shown the cylinder C with its operating piston 36, piston-rod 31—a, member 31, and dies 30. This is shown in its downward or lowest position or the same position as indicated in Fig. 2.

The movement of piston 36 in cylinder C is obtained and controlled by means of a second cylinder CC. This cylinder CC has a piston 54, operated by a piston rod 55, which is in turn, connected to a lever 57, which lever is moved by a cam 60, mounted on shaft 20. A pipe connection is provided from each end of the cylinder CC to corresponding ends of cylinder C. By corresponding ends, is meant that the pipe connecting to the upper end of cylinder CC or the piston-rod end, also connects to the piston-rod end of cylinder C. Also, the pipe which connects to the lower end of cylinder CC, or the end opposite the piston-rod, connects to the end of cylinder C also opposite its piston-rod. The reason for this is to insure a definite motion of the piston 36 in cylinder C with a definite motion of piston 54 in cylinder CC. It is obvious that there will be discharged from cylinder CC less liquid from the piston-rod end with a certain amount of piston movement, than there will be from the opposite end of the cylinder. Also, the relative diameters of the piston-rod 55, in cylinder CC, and the piston-rod 31—a in cylinder C must be so proportioned that the piston 36 will be moved a predetermined amount in either direction, for any given movement of piston 54, in either direction.

Both cylinders CC and C, together with their connecting pipes are filled with a suitable noncompressible liquid from tank 72. This liquid flows downwardly from the tank 72, thru pipes 66 and 67, thru check valves 64 and 65, into pipes 38 and 39, which pipes connect the respective ends of cylinder C and CC, together.

In order to insure that pressure is placed on the article by the dies 30, the amount of downward travel given to piston 54 is slightly more than is necessary to bring the piston 36 and the dies 30, in contact with the article. Continued travel of piston 54 after the dies 30 have contacted the moulded article places pressure on this article which pressure may be adjusted by relief-valve 69. After the piston 36 has stopped moving, by virtue of the fact that the die 30 is in contact with the article, such remaining liquid as is discharged from cylinder CC, by piston 54, is returned to tank 72, through relief-valve 69. When the dies 30 are to be lifted by the piston 36, the travel of piston 54, in cylinder CC, does not deliver quite as much liquid for its complete travel as it did on its down stroke. This is accomplished by increasing the relative size of the piston-rod in cylinder CC, so that the liquid space in this end of the cylinder is slightly less in proportion to the space contained in the piston-rod end of cylinder C.

Theoretically speaking, for the same upward and downward motion of the piston 54, the upward motion of the piston 36 is less than the downward. But, due to the fact that its downward motion is stopped by the dies 30 and 29, compressing the article between them, this excess downward travel is not accumulative, and the top and bottom travel of the piston 36 under control of piston 54, always brings it to the same top and bottom position.

On the upward travel of piston 54, the liquid displaced in cylinder CC, passes through pipe 39, to the under side of piston 36, thereby lifting it. The liquid from the top side of this piston 36, flows through pipe 38 to the bottom side of piston 54. It has already been stated that the size of the piston-rod 55 has been increased to limit the displacement space above the piston 54, in cylinder CC, and there will not be sufficient liquid above the piston 36, to fill the space below piston 54, as it moves upward. To provide additional liquid, connection is made to supply tank 72, through a check valve 64, which will open and keep the space below piston 54 from forming a vacuum, and insure that, at all times, the cylinders C and CC are full of liquid.

When the piston 54, again moves downwardly, it would of course, cause the piston 36 to over-travel but for the fact that the die 30 encounters the molded articles on die 29 and stops its movement. The excess liquid displaced by piston 54 after piston 36 stops, escapes through adjustable relief-valve 69, and the amount, of course, equals that drawn through check-valve 64 on the prior upward stroke thus establishing equilibrium of up and down movements of the respective pistons.

It will be noted that a relief-valve has been provided at 68 to relieve the pressure on pipe 39, or on the upward stroke side of piston 54. This is simply a safety device and will operate only in case some obstruction is placed in the way of the upward movement of member 31 and its dies 30. Failure of the piston 36, to reach its upward position at the proper time, due to some abnormal operating difficulty or perhaps due to the operator becoming caught in some part of the machine, can readily be arranged to stop the rotation of shaft 20, and thus prevent injury to either the machine or to the attendant. This safety precaution can be utilized on other operating cylinders, if desired.

The lever 57, swinging from its pivoted point 57—a, is operated by a cam 60 mounted on shaft 20. In the position shown, the cam-roll 60—a on the lever 57, is in position 61, in which position the dies 30 and 29 are held together. As the cam 60 rotates in the direction of the arrow, the lever 57 is lifted to cam position 63, in which case the die 30 is lifted to its upper position. As the cam 60 continues to rotate the cam-roll comes to position 62, where the die 30 is again pushed downward to bring the molded articles 121 near the conveyer 130, as has been previously described. The articles are blown off at this point, and the cam 60 quickly lifts the lever 57 to the cam position indicated at 63—a and the die 30 to its upper position, so that it can again move over die 29 to receive other articles.

The cylinder CC may be pivoted at its lower end as at 73, to take care of the slight circular motion of the end of the lever 57, and the piston-rod end 56. This pivoting of the end of the cylinder CC, also, provides for adjusting the piston-rod end 56 in the lever slot 58, to vary the travel of piston 54. After the piston-rod end 56 has been adjusted to the proper position in the slot 58, it is fastened against further movement endwise of the slot.

Between the cylinder CC and the pipes 38 and 39, are provided flexible connections 38—a and 39—a; these flexible connections permit the slight motion of cylinder CC about its mounting pivot 73.

It will thus be seen that by means of cam 60, on constantly rotating shaft 20, thru lever 57, piston 54 and cylinder CC, that for each revolution of the shaft 20, the dies 30 are given two upward and two downward movements at the proper times, first, to contact the article on the molding die 29, and second, to lay the article on the conveyer belt 130.

The longitudinal motion of the traveler 34 is accomplished by cylinder B, and its operating or driving cylinder BB, shown more in detail in Fig. 9. A cam 82 is mounted on shaft 20 and operates lever 77 through cam-roll 81. This lever is pivoted at 78, and the opposite end of the lever is provided with a slot 79 in which is secured the piston rod end 80, the piston-rod 76 and the piston 75 operating in cylinder BB. In the cam position shown in Fig. 9, the traveler 34 is in the position shown in Figs. 1 and 2, and the dies 29 and 30 are pressing the article between them. As soon as the cam 60 has operated to lift the dies 30, as has already been described, the lever 77 starts to move downwardly and the traveler 34, outwardly. The pipe connections between the cylinders BB and B are the same as described between CC and C, and the piston 43, in cylinder B, is operated back and forth by piston 75, in cylinder BB, under the control of lever 77 and cam 82.

For transverse movement of the dies 30, thru the travelers 40 and 41 operated by cylinder A, there is provided a cam 92, also located on shaft 20, and continuously rotating therewith. The operation of this traveler is different from the others, as it must take different positions for each cycle or machine step in order to distribute the articles transversely on the conveyer belt. Referring to Figs. 8, 12, 13 and 14, it will be seen that the motion of the travelers 40 and 41, is derived from a cam 92, driven at one-third the speed of rotation of the other cams on shaft 20, through gears 93 and 94. The general arrangement of cylinders and piping is the same as previously described for cylinders C and CC. In this case, the operating cylinder AA has a piston 84, piston-rod 85, piston-rod end 89, moved by a lever 86 pivoted at 87. This lever 86 moves the piston 84 by means of a roll 90, operated by cam 92.

In the cam position shown in Fig. 8, the traveler 34, is in the central position 128, shown in Fig. 1. Referring more particularly to Figs. 12, 13 and 14, the motion of the traveler 34 and also, of travelers 40 and 41, through three steps of the cycle are illustrated. In position 128 the traveler 34 is centered, and the dies 30 are in a position to receive an article from the forming dies 29. The first operation is performed by cylinder CC, which operates the piston in cylinder C, lifting die 30, with the molded articles thereon, from dies 29. Immediately after the die 30 has been lifted, cylinder BB starts cylinder B, to move traveler 34 from position 128 toward the conveyer belt. As soon as the traveler 34 has moved sufficiently to disengage the centering and locking members 101 and 102, cylinder AA starts to operate cylinder A, and move travelers 40 and 41 transversely of the conveyer belt, carrying with it the traveler 34, and dies 30, which are still moving outwardly by cylinder B.

Referring to Fig. 12, the path taken by the dies 30, is shown starting at 128, outwardly, for a certain distance, then both outwardly and transversely at 105, and finally, outwardly only to 106, at which point the articles 121 are deposited on the conveyer belt. After the articles have been deposited on the belt, the dies 30 move back to their starting point, or from 106 to 105 to 128, and are in a position to receive another article from the forming dies 29.

The next step comprises only a straight outward movement as illustrated at Fig. 13. The transverse cylinder does not operate at all in this cycle and the die travel is from 128 to 108 to 129, and back through 108 to the starting point 128, where the dies 30 are again in a position to receive a third lot of molded articles from dies 29. After a third group of articles have been taken from die 29, by die 30, the die 30 moves outwardly as in the first instance, until the locking and centering members 101 and 102 are clear, then the die 30 is moved to the left, transversely of the conveyer, instead of to the right as in the first instance. The path taken by die 30 in this case is shown at Fig. 14, and is from 128 to 111 to 112, where the articles are discharged onto the conveyer, and then the dies travel back to the starting point or from 112 to 111 to 128.

Referring to Fig. 8 and the cam 92, the position in which the cam is shown corresponds to the position 128 of the traveler 34. In this position, the traveler 34 is directly over the molding dies 29, as is shown in Figs. 1 and 2. The cam 92 rotates in the direction of the arrow, and its travel from the position shown at 90 to bring position 95 in contact with the cam-roll 90, pushes the piston 84 in cylinder AA downwards, and piston 50, in cylinder A, outward or toward the piston-rod end of said cylinder. This accomplishes the transverse movement of the traveler 34, as has already been described. The return movement of the traveler is accomplished by the continued rotation of the cam 92 from roll position 95, to roll position 96.

It will be noted that positions 90, 96 and 98, on the cam 92, are provided with relatively long dwell positions, or positions where the traveler is not moved in either direction. This is to give time for, first, the piston 36, to operate and separate the dies, and second, for the cylinder B to operate and clear the centering members 101 and 102. There is, also, a dwell at position 95, to permit the cylinder C to lower the dies 30 to the conveyer belt and lay the molded articles thereon. After the dies 30 have been moved from position 128 to 106 (see Fig. 12), and the cam 92 has rotated from position 90 to position 95, the continued rotation of the cam brings the lever 86 back to center position at cam position 96.

It has already been stated that the second step moves the dies 30 directly outward, hence there is no motion of the lever 86 as the cam 92 rotates from position 96, thru 97 to position 98, which corresponds to the die travel from 128 to 109, and back to 128 (see Fig. 13). The third step is the same as the first, except that the motion of the lever is upward from position 98 to position 99, and back to central position at the starting point or 90. This gives a die motion from 128 to 112, and back to 128 (see Fig. 14).

Mention has been made of the locking and centering members 101 and 102, shown in Fig. 5. When the dies 30 are in position to receive articles from dies 29, the dies must be accurately centered relative to each other, in order that the molded articles be properly transferred. While the pistons and cylinders give reasonably accurate movement to their respective parts, it is however, desirable that some mechanical means be provided to insure proper die relation at the time of transfer.

It has already been stated, that the first movement of the traveler 34 is directly outward, and that the traveler 40 is returned to central position before the traveler 34 has reached its position over the molding dies. This provides means whereby the traveler 34 may be accurately centered relative to transverse position. Mounted on the frame is a notched member 102 with rounded or flared opening. Mounted on the traveler 34 is a pointed member 101, having a straight portion adapted to closely fit a straight portion on the member 102, when the traveler 34 is at the end of its travel. Should the traveler approach the end of its stroke slightly out of its proper central position, the tapered or rounded portions of 101 and 102 will guide it into proper position.

It will be noted that the cam 92 has widened portions in the cam-track at positions 90, 96 and 98, or the points where the traveler 34 is over the molding dies. This clearance on the cam-track is to permit the piston in cylinder A, to move the piston in cylinder AA slightly, provided the position of the traveler 34 is corrected by the members 101 and 102.

The piping arrangement for cylinders A and AA, is in general the same as that already described for the cylinders C and CC. That is to say, the cylinder A with its piston 50 will be connected to the cylinder AA with its piston 84, and to a tank and valve arrangement including pressure adjusting valves just as in the case of the cylinders C and CC respectively.

It is possible that the relative adjustment of piston travel between the pistons 50 and 84 may become decentralized, such that the predetermined length of travel of the one piston with respect to the other will vary from the preferred setting. To overcome this difficulty, stops 114 are provided to limit the outward stroke of the travelers in both directions, and thereby insure that the return stroke to center position will always start from the same point throughout subsequent cycles or steps in the cycles of operation. These stops 114 will of course be ineffective during normal operation of the piston 50 relative to the piston 84, but if the relation between the pistons varies, then the stops will be effective to correct the error since they determine limitation of movement.

The method of centering the traveler 34 over the molding dies in its transverse movement has already been explained.

To insure that it be in proper location when it is returned in its longitudinal travel, from over the conveyor belt to a position over the molding dies, stops 134 are provided on the guide rods 39, or at some other convenient point, to limit the movement of the traveler 34 under urge of its piston 43.

The piping arrangement from the cylinders B and BB will likewise be the same as that already described for the cylinders C and CC including the relatively unequal travel between the pistons in cylinders C and CC, to insure that the traveler always reaches the same position at one end of the piston strokes, as heretofore described.

While I have shown dies for the production of a plurality of small and relatively deep articles it is obvious that a single article can be efficiently transferred from the molding dies to the conveyer belt, and the size of such article will be limited only by the die area and the width of the conveyer belt. In Fig. 1, there is shown by dot and dash lines, about each group of articles 121, the area which may be taken up by a single article on the conveyer 130. This article may be a flat, relatively thin or shallow or any other desired shape.

While I have shown the articles distributed on the conveyer in three rows, by a suitable arrangement of the transverse distributing mechanism and cam design of Fig. 8, it is obvious that these articles may be distributed in a lesser or greater number of rows than the three illustrated.

My preferred method of operating the transfer mechanism is by means of the hydraulic links or interlocked hydraulic cylinders illustrated. This provides a simple and reliable means for moving the transfer member 31 rapidly and smoothly between its several positions; providing an abutment to absorb the pressure when the article is compressed between the dies, permits the transfer mechanism to be made light in weight requiring little effort to move it rapidly and to considerable distance, for the distribution of large articles or groups of articles over a considerable area of the conveyer belt.

While my preferred form of mechanism for operating the transfer carrier is through hydraulic links and my preferred mechanism for intermittently stepping or rotating the molding unit is mechanical, I may substitute a mechanical or hydraulic means for those shown without departing from the scope of my invention.

It will thus be seen that I have provided a simple mechanism for the molding of large articles or for large groups of individual smaller articles, with a device which transfers these articles while in a fragile and easily damaged state to a conveyer or other device with little possibility or opportunity for damage or injury.

While the article or groups of articles are moved rapidly from their molding position to their position on the conveyer belt, the delivery of said articles to the conveyer belt is gently performed, without dropping the articles on the belt unevenly, or through any great distance. These two features insure, not only rapid production, but the production of uniformly perfect articles, uninjured or undistorted at a critical state in their production.

Having thus described my invention what I claim is:

1. A machine for molding fibrous pulp comprising an intermittently movable die carrier, a forming die mounted on said carrier, means to supply a layer of pulp to said die, a cooperating die, a carrier on which said cooperating die is mounted, a piston and piston rod for moving said cooperating die into alinement with said forming die, and a piston and rod for moving said cooperating die into compressive relation with said forming die.

2. In a machine for molding fibrous pulp articles, a plurality of forming dies revoluble about an axis, means to positively revolve said dies about said axis progressively from position to position into and out of a pulp mixture, means to hold said dies in position when said revoluble means is inoperative, means hydraulically operated to bring a cooperating die into approximate alinement with one of said aforementioned forming dies and mechanical means for locking said last die in accurate alinement with said forming die.

3. In a machine for molding fibrous pulp articles, a plurality of forming dies revoluble about an axis, means to periodically deposit a layer of fibrous pulp on said dies, means to positively revolve said dies about said axis from position to position, means to hold said dies in their respective positions during such time as the revolving means is inoperative, means hydraulically operated to bring a cooperating transfer die into approximate alinement with one of said aforementioned forming dies, mechanical means for correcting said transfer die position to bring it into accurate alinement with said forming die, and means to bring said transfer die into compressive relation with the previously deposited layer of pulp on said forming die.

4. In a machine for molding a fibrous pulp article, a plurality of forming dies revoluble about an axis, means to deposit a layer of fibrous pulp on each of said dies, means to positively revolve said dies about said axis from position to position, means to hold said dies in previously placed positions during such time as the revolving means is inoperative, means hydraulically operated to bring a cooperating transfer die into approximate alinement with said aforementioned forming dies, mechanical means for correcting the position of said transfer die to bring it into accurate alinement with said forming dies, and means comprising a hydraulic cylinder and piston for bringing said transfer die to compressive relation with the previously deposited layer of pulp on said forming dies and for operating said dies after compression, means to effect removal of said layer of pulp from said forming dies, and means to effect retention of said layer of pulp on said transfer die.

5. In a machine for molding fibrous pulp articles, a plurality of forming dies revoluble about an axis, means to deposit a layer of fibrous pulp on said dies, means to positively move said dies about said axis from position to position, means to retain said dies in stated positions, means hydraulically operated to bring a cooperating transfer die into approximate alinement with one of said aforementioned forming dies, and to move said cooperating transfer die from an approximate alined position with said forming die to other positions removed therefrom, means to correct the position of said transfer die to bring it into accurate alinement with said forming die, said hydraulically operated means being effective to bring said transfer die into compressive relation with a previously deposited layer of pulp on said forming die and to separate said dies after compression, means to retain said layer of pulp on said transfer die, means to move said transfer die from alined position, and means to discharge said layer of pulp from said transfer die when said transfer die is in a position removed from said forming die.

6. In a machine for molding fibrous pulp articles, a plurality of forming dies mounted for revoluble movement about an axis, a tank containing a fibrous pulp mixture in which said dies are periodically immersed during a period of their revoluble movement about said axis, means to deposit a layer of pulp on said dies while immersed in said pulp mixture, means to move said dies from said mixture, a co-operating, hydraulically operated die movable in coacting relation to said forming dies, in two directions, means comprising a piston operable in a cylinder through a direction substantially normal to said co-operating die, and means to compress the pulp on said forming dies and remove same therefrom, and a second piston and cylinder effective to move the coacting dies in a substantially horizontal direction to deliver articles formed of the pulp to a plurality of locations removed from the forming dies.

7. A machine for molding fibrous pulp articles, comprising a plurality of forming dies revoluble about an axis, a driving shaft member adapted to positively revolve said forming dies about said axis from position to position, means to lock said dies in stated positions during such time as the revolving means is inoperative, and a hydraulically operated, cooperating die movable in one direction to compress and receive the article from the forming dies and movable in another direction to transfer said article to a conveyer.

8. A machine for molding fibrous pulp articles comprising a constantly rotating driving shaft, means on said shaft to intermittently revolve a plurality of forming dies about an axis, means on said constantly rotating shaft for operating a piston within a cylinder, fluid connections from each end of said cylinder to a second cylinder, whereby movement of the piston in the first cylinder in either direction results in a corresponding movement of the piston in the second cylinder, and a transfer die cooperative with said forming dies, connected to the piston in said second cylinder.

9. In a machine for molding fibrous pulp, comprising a molding die, means to deposit a layer of fibrous pulp on said molding die, means to remove said die from a molding position to a transfer position, a carrier movable in a substantially vertical direction, a transfer die mounted on said carrier, means cooperative with said carrier to bring said transfer die into compressing relation to the layer of pulp on the molding die, means to effect transfer of said layer of pulp from said molding die to said transfer die, means to move said transfer die in a substantially horizontal direction, and means to discharge the article from said transfer die.

10. In a machine for molding fibrous pulp, a constantly rotating shaft having cams mounted thereon, a rotatable die shaft with molding dies mounted thereon and adapted to be intermittently rotated by an actuating means on said cam shaft, means to lock against rotation and release for rotation, the above mentioned rotatable die shaft, said locking and releasing means being operated by a second cam on said cam shaft, a transfer die, and a plurality of other cams on said cam shaft adapted to bring said transfer die into alinement with said molding dies, and to effect a movement of said transfer die from said alinement position with said molding dies to a plurality of positions removed therefrom.

11. In a machine for molding fibrous pulp, a constantly rotating cam shaft, and an intermittently rotated molding die shaft with molding dies mounted thereon, a transfer die, a cam on said constantly rotating shaft, a piston movable in a cylinder by said cam, a second cylinder and piston, hydraulic means operatively connecting said cylinders, and actuating means for the transfer die, between the piston in second cylinder and said transfer die, effective to move said transfer die to a cooperative relation with one of said molding dies.

12. In a machine for molding fibrous pulp, a plurality of pulp molding dies intermittently revolved about an axis, a transfer die, means to bring said transfer die into cooperative relation with a layer of fibrous pulp on said molding die including hydraulic means to compress said layer of pulp between said transfer die and said molding die and means comprising a hydraulic relief valve for adjusting pressure between said transfer and said molding dies.

13. In a machine for molding fibrous pulp having forming and molding dies, said machine comprising a constantly rotating driving shaft, means on said shaft to intermittently revolve a plurality of forming dies about an axis, means on said constantly rotating shaft for operating a piston within a hydraulic cylinder, a second hydraulic cylinder, a second piston within said second cylinder, and a cooperating molding die connected to said second piston for actuation thereby, and hydraulic means including pipe connections between said cylinders providing a hydraulic link to actuate said second piston and effect the desired movement of said molding die.

14. In a machine for molding fibrous pulp, comprising a molding die, means to deposit a layer of fibrous pulp on said molding die, means to remove said die from a molding position to a transfer position, a carrier movable in a substantially vertical direction, a transfer die mounted on said carrier, hydraulic means cooperative with said carrier to bring said transfer die into compressing relation to the layer of pulp on the molding die, means to effect transfer of said layer of pulp from said molding die to said transfer die, hydraulic means to move said transfer die in a substantially horizontal direction, means to discharge the article from said transfer die, and means for synchronizing the actions of the respective hydraulic means whereby to effect the desired movements of said dies.

15. In a machine for molding fibrous pulp, a hydraulic cylinder, a piston within said cylinder, a piston rod movable by said piston, a pulp molding die connected to said piston rod for actuation thereby, transfer means for pulp molded on said die comprising a second hydraulic cylinder having a piston therewithin, and a hydraulic link for said cylinders comprising a pipe connection between the piston ends of said cylinders, and a pipe connection between the piston rod ends of said cylinders, and a piston rod connected to the piston in said second cylinder of a size in proportion to the piston rod in said first cylinder to insure relatively different lengths of piston travel in one direction, with a constant length of piston travel in both directions for the piston in said first mentioned cylinder, whereby the die connected to the piston in the first cylinder will partake of uniform movement in both directions of piston travel and will be provided with variable rest periods at the end of its travel in one direction.

16. A machine for molding a fibrous pulp article comprising a plurality of forming dies revoluble about an axis, a tank containing a fibrous pulp mixture into which said forming dies are periodically immersed, means to revolve said dies about said axis, a transfer die, a hydraulic cylinder having a piston therein operable to bring said transfer die into a registering position with one of said forming dies, a second hydraulic cylinder having a piston therein operable thereafter to bring said transfer die into co-acting relation with said forming die, means to operate said piston in said second hydraulic cylinder to produce a compressing action between said transfer die and the forming die with which it is co-acting, and means effective thereafter to remove the formed pulp article from the forming die and to transfer it with the transfer die to a location remote from the forming die.

17. A machine for molding a fibrous pulp article comprising a plurality of forming dies revoluble about an axis, a tank containing a fibrous pulp mixture into which said forming dies are periodically immersed, means to revolve said dies about said axis, a transfer die and a traveling conveyor belt, a hydraulic cylinder having a piston therein operable to bring said transfer die into a registering position with one of said forming dies, a second hydraulic cylinder having a piston therein operable thereafter to bring said transfer die into co-acting relation with said forming die, means to operate said piston in said second hydraulic cylinder to produce a compressing action between said transfer die and the forming die with which it is coacting, and means effective thereafter to remove formed pulp articles from the respective forming dies and to transfer them with the transfer die to a location remote from the forming dies, and to effect distribution of such articles upon said traveling conveyor belt.

MERLE P. CHAPLIN.